United States Patent [19]

Rasmussen et al.

[11] 4,453,641
[45] Jun. 12, 1984

[54] GRAVITY-FEED STORAGE AND DELIVERY SYSTEM

[75] Inventors: George E. Rasmussen, Richton Park, Ill.; Lucius B. Donkle, Jr., Michigan City, Ind.

[73] Assignee: Interlake, Inc., Oak Brook, Ill.

[21] Appl. No.: 399,457

[22] Filed: Jul. 19, 1982

Related U.S. Application Data

[63] Continuation of Ser. No. 136,396, Apr. 1, 1980, abandoned.

[51] Int. Cl.$^3$ .............................................. A47F 5/00
[52] U.S. Cl. ................................... 211/151; 211/187; 248/243
[58] Field of Search ...................... 211/49 D, 151, 187, 211/191, 192, 162, 208; 108/107, 108, 109; 248/243

[56] References Cited

U.S. PATENT DOCUMENTS

| | | | |
|---|---|---|---|
| 3,063,534 | 11/1962 | Amour | 211/162 |
| 3,895,775 | 7/1975 | Sharp | 108/108 |
| 3,900,112 | 8/1975 | Azzi et al. | 211/49 D |
| 4,374,451 | 2/1983 | Rasmussen et al. | 211/151 |
| 4,383,614 | 5/1983 | Miller | 211/151 |
| 4,394,910 | 7/1983 | Miller | 211/151 |
| 4,405,052 | 9/1983 | Spiros | 211/187 |

Primary Examiner—William H. Schultz
Assistant Examiner—Ramon O. Ramirez
Attorney, Agent, or Firm—Emrich & Dithmar

[57] ABSTRACT

A gravity-feed storage and delivery rack includes upstanding support frames and a plurality of vertically-spaced shelf frames mounted between the support frames by means of mounting clips which have prongs receivable in complementary apertures in the columns of the support frames. The clips are channel-shaped along their entire length, the channel side walls having inclined retaining surfaces thereon which cooperate with the associated support column to form a notch providing a wedge-fit for a side rail of the shelf frame. Each shelf frame side rail is provided with a plurality of apertures adjacent to the rear end thereof for receiving a stop pin which projects laterally therefrom for engagement with the rear columns of the support frames to facilitate front-to-back adjustment of the shelf frames with respect to the rack. A mezzanine construction is disclosed having stacked racks with vertical-column support frames and front-to-back staggered shelf frames.

16 Claims, 7 Drawing Figures

GRAVITY-FEED STORAGE AND DELIVERY SYSTEM

BACKGROUND OF THE INVENTION

This is a continuation of application Ser. No. 136,396, filed Apr. 1, 1980, now abandoned.

The present invention relates to gravity-feed storage systems or gravity flow racks. Such gravity-feed rack constructions are disclosed for example, in U.S. Pat. Nos. 3,063,534 and 3,900,112 and, as outlined in those patents, such systems afford a number of advantages over standard shelving in industry, warehousing and retailing applications. Such rack assemblies typically comprise a plurality of vertically-spaced shelf frames mounted between upstanding support frames, the shelf frames being inclined slightly from the horizontal to provide an inclined ramp down which merchandise can slide from the back to the front of the rack assembly. Prior art arrangements include vertical-front racks with the front columns of the support frames being vertical and with the front edges of the shelf frames all being in vertical alignment with one another. There are also provided "layback" arrangements, wherein the front support columns of the support frames are inclined rearwardly, with the shelf frames being arranged in a front-to-back staggered relationship to facilitate access to the merchandise stored thereon, particularly the removal of individual items from cartons.

But in both of these arrangements, the shelf frames are connected at the same points thereon to the support frames by means of hanger clips or the like, the clips typically fitting into cutout notches or recesses in the shelf frames. There is no provision for adjusting the position of an individual shelf frame forwardly and rearwardly with respect to the support frames. Thus, "layback" arrangements can be provided only by using support frames having rearwardly inclined front columns and the angle of the "layback" must follow that of the inclined support columns. This disadvantage is particularly troublesome in the mezzanine arrangements where one row of storage racks is stacked atop another. For structural reasons support frames having all vertical columns are preferable for mezzanine arrangements because they facilitate the interconnection of the upper and lower racks. But this prevents the use of "layback" shelf frame arrangements in mezzanine applications.

Furthermore, the mounting clips used in these prior art devices have relatively poor lateral strength and rigidity and tend to become bent or deformed as a result of lateral stresses in the rack system. Also the manner of interconnection of the mounting clips with the shelf frames affords an undesirable amount of play, tending to result in a loose and rattly construction.

SUMMARY OF THE INVENTION

The present invention provides an improved gravity-feed storage and delivery rack which overcomes the disadvantages of prior art systems and affords additional structural and operating advantages.

It is a general object of this invention to provide an improved mounting clip for interconnecting the shelf frames and the support columns of a gravity-feed storage and delivery rack, the mounting clip having enhanced strength and rigidity.

In connection with the foregoing object, it is another object of this invention to provide a mounting clip of the type set forth, which cooperates with the associated support columns to provide a wedge fit for the shelf frames thereby rigidly to hold the assembly together.

It is another object of this invention to provide an improved shelf frame for a gravity-feed storage and delivery rack which is readily adjustable front-to-back with respect to the support columns of the rack.

Still another object of this invention is the provision of a mezzanine construction for a gravity-feed storage and delivery system which permits the stacking of vertical-column storage racks while providing a "layback" arrangement of the shelf frames on both levels of the system.

These and other objects of the invention are attained by providing in a gravity-feed merchandise storage and delivery rack, the combination comprising a plurality of upstanding support columns, each of the support columns having a vertical wall with a plurality of longitudinally spaced-apart apertures therein; a plurality of vertically-spaced shelf frames mounted between the support column, each of the shelf frames including a pair or elongated side rails, front and back members interconnecting the side rails, merchandise support tracks carried between the front and back members each of the side rails having a plurality of equidistantly longitudinally spaced-apart apertures therein adjacent to the rear end thereof, and a stop member receivable in a selected one of the apertures and projecting from the side rail for engagement with a rear one of the support columns accurately to position the shelf frame front-to-back with respect to the rack; and a plurality of mounting clips for interconnecting the shelf frame side rails and the support columns, each of the mounting clips comprising an elongated channel-shaped body including a main wall and two side walls respectively projecting from the opposite side edges of the main wall and extending substantially the entire length thereof, prongs projecting from the side walls away from the main wall and receivable in selected ones of the apertures in an associated one of the support columns to secure the body in a mounted configuration of the support column, bearing surfaces on the side walls engageable with the vertical wall of the associated one of the support columns for limiting the depth of insertion of the prongs and cooperating therewith rigidly to hold the body in the mounted configuration on the column, the retaining surfaces cooperating with the vertical wall of the associated support column when the body is disposed in the mounted configuration thereof to form a notch for receiving therein an associated one of the shelf frame side rails for engagement with the support surfaces and support thereon.

Further objects of the invention pertain to the particular arrangement of the parts of the gravity-feed storage and delivery rack whereby the above-outlined and additional operating features thereof are attained.

The invention, both as to its organization and method of operation, together with further objects and advantages thereof, will best be understood by reference to the following specification taken in connection with the accompanying drawings.

DESCRIPTION OF THE PREFERRED EMBODIMENT

Figure 1:
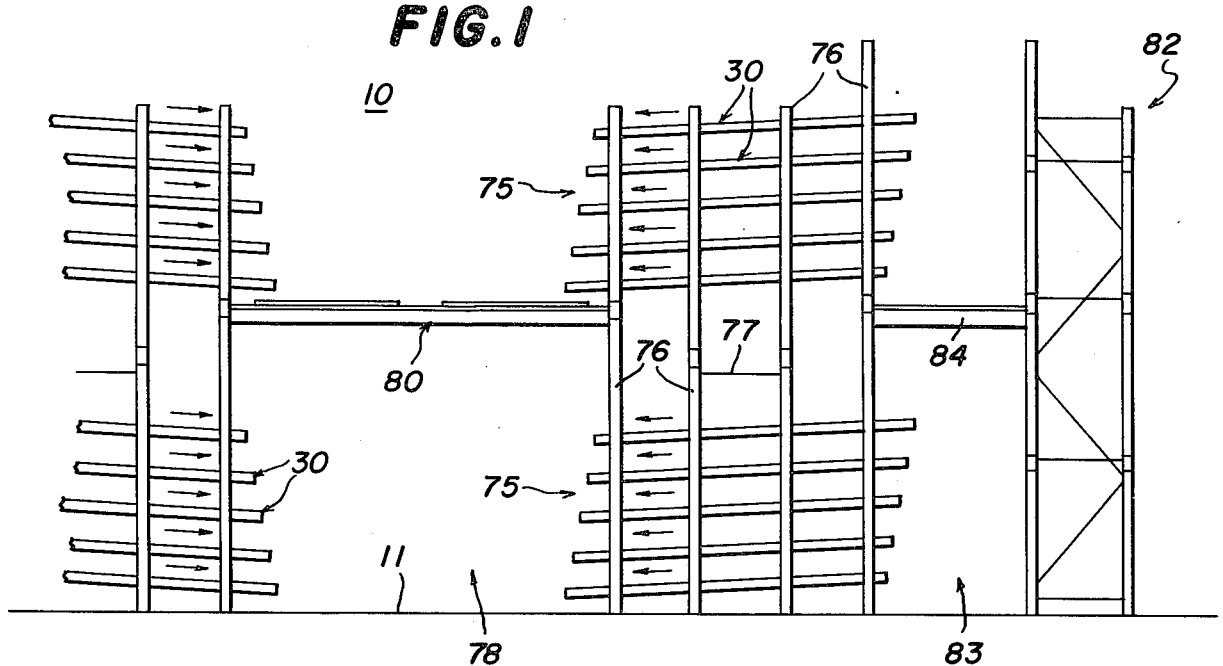
FIG. 1 is a fragmentary elevational view of a mezzanine construction incorporating the gravity-feed storage and delivery rack of the present invention.
Figure 2:
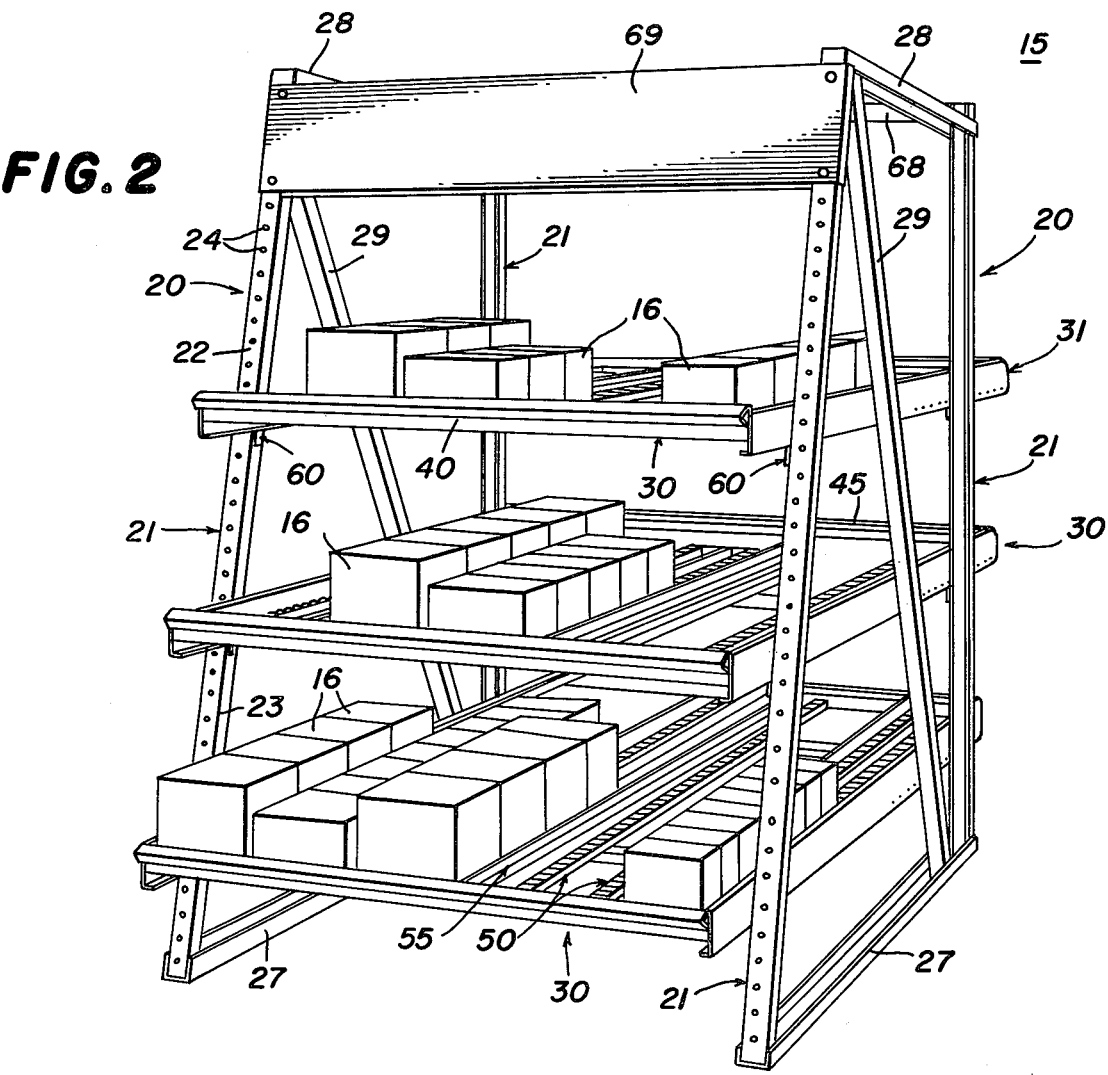
FIG. 2 is a perspective view of a single storage rack bay constructed in accordance with and embodying the features of the present invention.

Referring to FIGS. 1 and 2 of the drawings, there is illustrated a gravity-feed storage system, generally designated by the numeral 10, which is disposed upon the floor 11 of a warehouse, factory or the like, and includes a plurality of substantially identical storage rack units or bays 15 or 75, each of which is designed for the gravity-feed storage of a plurality of packages or cartons 16 of merchandise in a well-known manner. While the system 10 illustrated in FIG. 1 is a mezzanine-type arrangement comprising two levels of storage, it will be understood that single-level systems may also be used. Such systems typically comprise a plurality of storage rack bays 15 or 75 arranged side by side in a straight line along a transport aisle to provide a storage system of any desired length.

Each storage rack bay 15 includes a pair of upstanding support frames, generally designated by the numeral 20, between which are mounted a plurality of vertically-spaced shelf frames, generally designated by the numeral 30. Each support frame 20 includes at least two upright support columns 21 respectively disposed at the front and rear of the support frame 20, each column 21 being generally channel-shaped in transverse cross section and including a main wall 22 and two side walls 23. The main wall 22 has a plurality of longitudinally equidistantly spaced-apart circular apertures 24 therein, while each of the side walls 23 has a plurality of longitudinally spaced-apart rectangular slots 25 therein, the slots 25 preferably being arranged in two parallel rows, with the slots of one row being longitudinally offset with respect to the slots of the other row a distance equal to one-half the distance between adjacent slots in a row. Preferably, this distance between adjacent slots in the same row is one inch. The main wall 22 is also provided with a plurality of indicia 26 comprising a scale for measuring distance along the column 21, these indicia 26 preferably being disposed at one-inch intervals. Suitable numerals may also be inscribed at intervals along the columns 21 to facilitate reading of the scale.

Each of the support columns 21 is fixedly secured at the lower end thereof to a bottom rail 27 and at the upper end thereof to a top rail 28, the bottom and top rails 27 and 28 also being interconnected by a diagonal brace 29, the members 27, 28 and 29 all being of channel-shaped construction. While the support frames 20 are illustrated in FIG. 2 with the rearmost support columns 21 thereof vertical and with the frontmost support columns 21 thereof inclined rearwardly, it will be appreciated that the support frames 20 may also be formed with the front and rear support columns thereof parallel, either vertical or inclined rearwardly. It will be understood that additional support columns 21 and diagonal braces 29 may be provided, as necessary, depending upon the overall front-to-back depth of the support frames 20. It will also be understood that, as additional storage rack bays 15 are added to the system, each additional bay requires only one additional support frame 21, since it will share a support frame 21 in common with the adjacent bay.

Referring now also to FIGS. 3 through 7 of the drawings, each of the shelf frames 30 includes a pair of laterally spaced-apart side rails 31 which are constructed substantially as mirror images of each other. Each of the side rails 31 includes an elongated flat planar main wall 32 substantially rectangular in shape and provided at the upper edge thereof with a laterally inwardly extending top flange 33 having a depending lip 34 thereon, the main wall 32 being provided at the lower edge thereof with a laterally inwardly extending bottom flange 35. The bottom flange 35 is cut away along elongated sections adjacent to the front and rear ends thereof to expose the lower edge of the main wall 32 to provide support edges 36. The remaining portions of the bottom flange 35 at the front and rear ends of the side rail 31 form stop fingers or tabs 37 for a purpose to be explained more fully below. Formed in the main wall 32 adjacent to the rear end thereof is a row of longitudinally equidistantly spaced-apart circular apertures 38, adapted to receive therethrough a stop pin or bolt 39 (see FIG. 7) which may be secured in place by a complementary nut (not shown).

The side rails 31 of the shelf frame 30 are interconnected adjacent to the front and rear ends thereof respectively by a front rail 40 and a rear rail 45. The front rail 40 comprises a flat rectangular plate which forms a front wall for the shelf frame 30 and is provided at the lower edge thereof with a rearwardly extending rectangular attachment flange 41 which is provided with a plurality of longitudinally equidistantly spaced-apart holes 42 therein. The front rail 40 is provided at the upper edge thereof with a downwardly and forwardly inclined front flange 43, which may conveniently form a handle or handgrip for facilitating handling of the shelf frame 30 and may be used for affixing thereto a label, nameplate or the like to identify the merchandise stored on the shelf frame 30.

The rear rail 45 forms a rear wall for the shelf frame 30, and includes a forwardly extending rectangular attachment flange 46 which is preferably also provided with a plurality of equidistantly longitudinally spaced-apart holes (not shown) therein. There may also be provided a cross channel 47 for interconnecting the side rails 31 intermediate the ends thereof, the opposite ends of the cross channel 47 preferably being disposed upon the bottom flanges 35 of the side rails 31. Preferably, the front and rear rails 40 and 45 and the cross channel 47 are fixedly secured to the side rails 31 as by welding. It will be understood that, depending upon the front-to-back depth of the shelf frame 30, additional cross channels 47 may be provided as needed.

Figure 3:
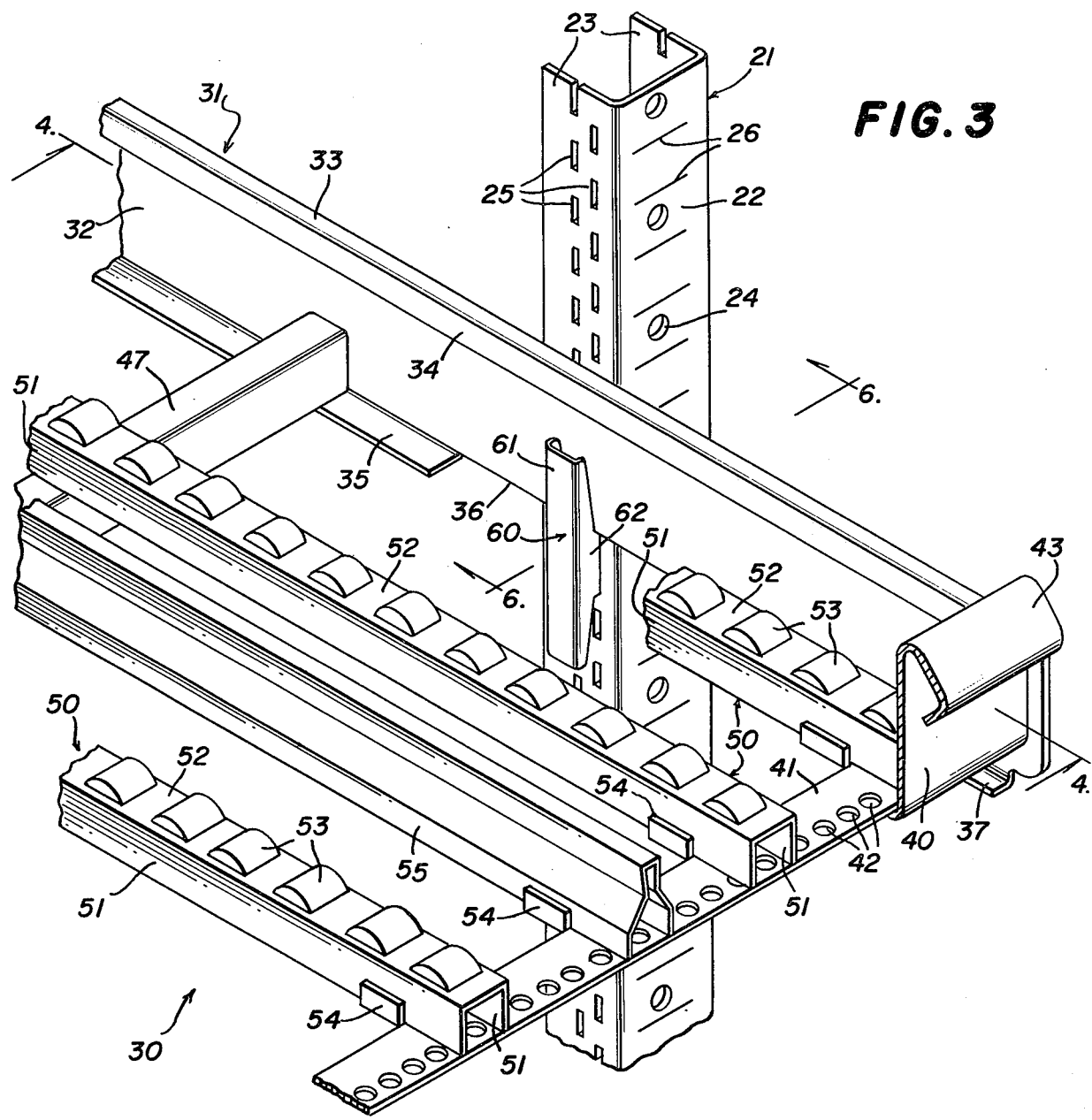
FIG. 3 is an enlarged fragmentary perspective view of one of the shelf frames of the storage rack of FIG. 2, with portions thereof broken away more clearly to illustrate the construction thereof and the manner of interconnection thereof with a support column.
Figure 4:
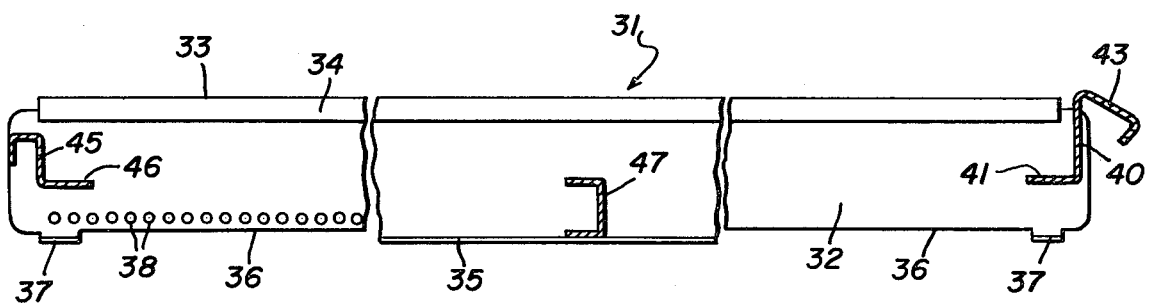
FIG. 4 is a reduced view taken along the line 4—4 in FIG. 3, illustrating one of the shelf frame side rails.

Each of the shelf frames 30 also includes a plurality of wheel tracks, generally designated by the numeral 50. Referring to FIG. 3, each of the wheel tracks 50 includes an elongated channel member having a pair of legs 51 interconnected by a bight portion 52, the bight portion 52 having a plurality of longitudinally spaced-apart rectangular apertures therein. Mounted between the legs 51 are a plurality of shafts or axles (not shown) respectively rotatably carrying roller wheels 53 which respectively project upwardly through the apertures in the bight portion 52.

In use, each of the wheel tracks 50 is disposed with the bight portion 52 thereof positioned upwardly and with the opposite ends of the legs 51 respectively overlying the attachment flanges 41 and 46 of the front and rear rails 40 and 45. Preferably, attachment clips 54 are secured to the front and rear ends of each of the wheel tracks 50, the attachment clips 54 extending beneath the attachment flanges 41 and 46 and having projections which extend upwardly through the holes 42 therein fixedly to position the wheel tracks 50 on the shelf frame 30. Preferably, the wheel tracks 50 are arranged in pairs, each pair of wheel tracks 50 defining a front-to-back path along the shelf frame 30 for supporting a row of cartons 16, the lateral spacing of the wheel tracks 50 in each pair varying with the width of the cartons 16 to be supported thereon. It will be appreciated that, in the event of unusually long cartons, more than two wheel tracks 50 may be provided in each path to provide the necessary support for the cartons.

The carton paths are separated by elongated guide rails 55 which are generally in the shape of inverted channel members, the front and rear ends of which respectively overlie the attachment flanges 41 and 46 and are secured thereto by attachment clips 54 in the same manner as are the wheel tracks 50. The guide rails 55 cooperate with each other and with the side rails 31 of the shelf frame 30 to guide the cartons 16 along the wheel track paths and limit lateral movement thereof. It will also be appreciated that, in use, the wheel tracks 50 overlie the cross channels 47, the upper flanges of which are arranged to be substantially coplanar with the attachment flanges 41 and 46.

Figure 5:
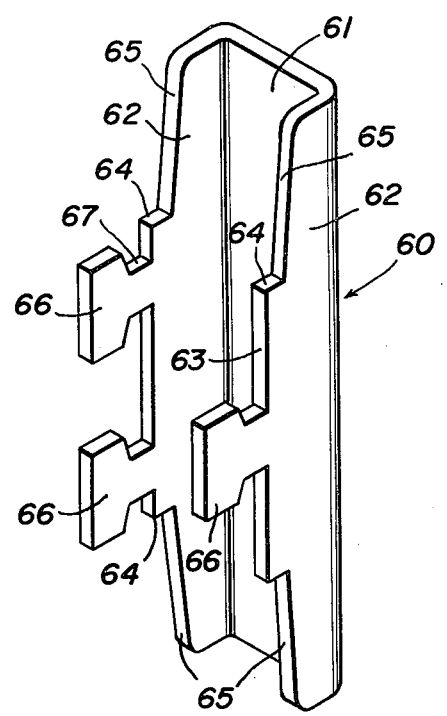
FIG. 5 is an enlarged perspective view of one of the mounting clips constructed in accordance with and embodying the features of the present invention.
Figure 6:
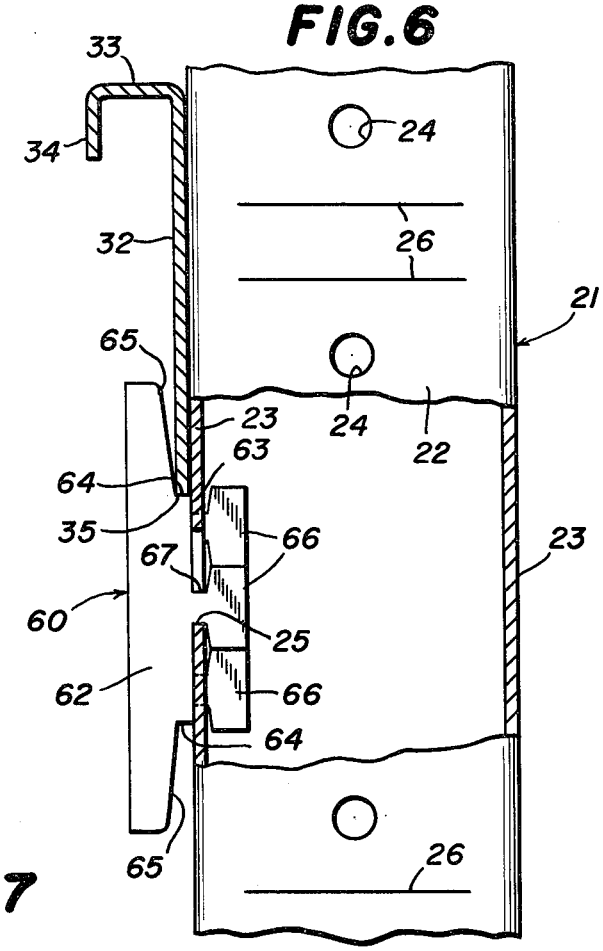
FIG. 6 is an enlarged fragmentary view in partial section taken along the line 6—6 in FIG. 3.

Referring now in particular to FIGS. 3, 5 and 6 of the drawings, the shelf frames 30 are mounted on the support frames 20 by the use of mounting clips, generally designated by the numeral 60. Each mounting clip 60 is generally channel-shaped in transverse cross section, including an elongated flat rectangular main wall 61 and two side walls 62 respectively integral with the main wall 61 and projecting therefrom along the side edges thereof. The side walls 62 are respectively provided with elongated substantially coplanar bearing surfaces 63 intermediate the ends thereof. The bearing surfaces 63 are substantially parallel to the main wall 61 and are respectively connected at the opposite ends thereof by short support shoulders 64 to guide surfaces 65 which extend from the support shoulders 64 to the adjacent ends of the mounting clip 60 and are inclined outwardly toward the main wall 61. Preferably, the support shoulders 64 are substantially normal to the bearing surfaces 63, while the guide surfaces 65 are inclined at an angle of about five degrees to the bearing surfaces 63.

One of the side walls 62 is provided with two prongs 66 projecting from the corresponding bearing surface 63 away from the main wall 61, the prongs 66 being connected to the bearing surface 63 by a narrow neck 67. The prongs 66 are shaped complementary to the rectangular slots 25 in the support columns 21 and are spaced apart the same distance as are the slots 25. The other side wall 62 of the mounting clip 60 has a single prong 66 projecting from the bearing surface 63 thereof and positioned midway between the prongs of the first side wall 62.

In use, the mounting clip 60 is attached to a support column 21 by inserting the prongs 66 into selected ones of the slots 25, it being appreciated that the two prongs 66 on one of the mounting clip side walls 62 will be disposed in adjacent slots 25 in one row of slots, while the single prong 66 on the other mounting clip side wall 62 will be disposed in the intermediate slot in the adjacent row of slots on the column 21. The prongs 66 are dimensioned so as to just fit through the slots 25, the narrow necks 67 permitting the mounting clip 60 to drop into a latched position on the support column 21 when the enlarged head portions of the prongs 66 have passed all the way through the side wall 23 of the support column 21, as illustrated in FIG. 6. When disposed in this mounted configuration illustrated in FIG. 6, the bearing surfaces 63 of the mounting clip 60 will be disposed in engagement with the outer surface of the support column side wall 23. Preferably, the neck portions 67 of the mounting clip prongs 66 have a length only very slightly greater than the width of the support column side wall 23 so as to provide a firm and non-wobbling mounting of the clip 60 on the support column 21.

In use, two mounting clips 60 are respectively fastened to the inner sides of the frontmost support columns 21 of the storage rack bay 15 at a first vertical level, and two mounting clips 60 are respectively mounted on the inner side walls of the rearmost ones of the support columns 21 at a second vertical level which is slightly higher than the first level of the front clips, the indicia 26 on the support columns 21 serving to facilitate accurate positioning of the mounting clips 60 thereon. In this regard, it will be noted that when a mounting clip 60 is moved upwardly one slot 25 along the support column 21, without changing the orientation of the mounting clip 60, it will have been moved one inch. But it will also be noted that the mounting clip 60 is a double-ended clip, and if the clip is inverted, it can be moved in one-half inch increments by inserting the single prong 66 into either the upper or lower one of the pair of slots 25 in which the pair of prongs 66 had previously been inserted, for moving the clip 60 up or down one-half inch from its original position.

When the mounting clips 60 have been mounted in the desired positions on the support columns 21, the shelf frame 30 is mounted in place between the support frames 20 by lowering it into place onto the mounting clips 60. In this regard, it will be noted that the bottom flanges 35 of the shelf frame side rails 31 have been removed in the regions adjacent to the support columns 21, so that the support edges 36 of the side rails 31 can slide into the notches defined by the mounting clip guide surfaces 65 and the adjacent side walls 23 of the support columns 21, as best seen in FIGS. 3 and 6. The support edges 36 are lowered into engagement with the support shoulders 64 of the mounting clips 60 securely to support the shelf frame 30 on the mounting clips 60.

It is a significant feature of the present invention that the inclined guide surfaces 65 of the mounting clips 60 serve to guide the shelf frame side rails 31 into position on the mounting clips 60 and also serve to provide a secure wedge fit of the shelf frame side rails, which insures a firm mounting of the shelf frame 30, even in the event of slight dimensional irregularities in the thickness of the side rails 31. Also, the channel shape of the mounting clips 60 along the entire length thereof substantially increases the strength and rigidity thereof to prevent bending of the mounting clips 60 in response to lateral stresses in the storage rack.

Because of the elevation of the rear mounting clips 60 with respect to the front mounting clips 60, there will be a slight inclination of the shelf frame 30 which will cause the cartons 16 to roll downwardly and forwardly along the paths of the wheel tracks 50 in a well-known manner. Thus, cartons may be added to each row of cartons at the rear end thereof and will progress forwardly for rremoval at the front end of the shelf frame 30.

It is a significant feature of the present invention that the unique construction of the shelf frame side rails 31 permits front-to-back adjustability of the position of the shelf frame 30 on the support frames 20. Thus, instead of being provided with a single notch at each of the front and rear ends thereof for engagement with the corresponding mounting clips 60, as in the prior art, the shelf frame side rails 31 have elongated support edges 36 thereon. Thus, it will be appreciated that the shelf frame 30 can be slid forwardly or rearwardly the entire length of the support edges 36 to any desired position, this movement being limited by engagement of the stop fingers 37 with the adjacent mounting clips 60. In order to facilitate the accurate positioning of the shelf frame 30, the apertures 38 at the rear ends of the side rails 31 are spaced apart by predetermined intervals and may be provided with suitable indicia to further facilitate accurate positioning.

Figure 7:
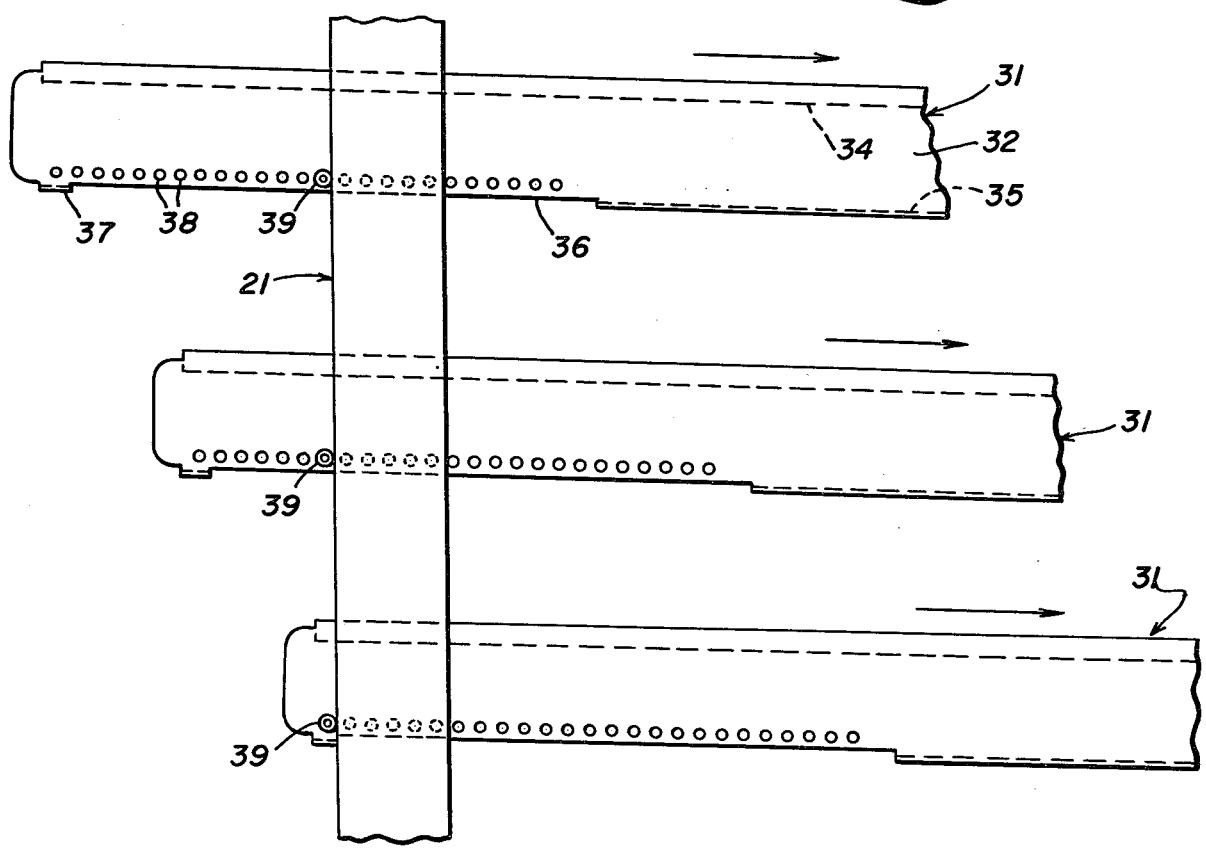
FIG. 7 is a fragmentary side elevational view of the rear portion of the storage rack of FIG. 2, as viewed from the left-hand side thereof and illustrating the manner of shelf frame adjustment.

Thus, the shelf frame 30 may be moved forwardly or rearwardly until a predetermined one of the apertures 38 is disposed adjacent to the rear edge of the rearmost support column 21 of the support frames 20, with the stop pin 39 being inserted into the predetermined aperture to prevent further forward movement of the shelf frame 30. Thus, by simply positioning the pins 39 at the same position in each of the shelf frame side rails 31, accurate location of the shelf frame 30 without warping thereof is easily achieved. Referring to FIG. 7, it can be seen that by varying the locations of the pins 39 in adjacent shelf frames by a predetermined number of apertures, a front-to-back staggered or "layback" arrangement of the shelf frames can be achieved, regardless of whether the front support columns 21 of the support frames 20 are vertical or inclined. This affords a significant advantage over prior art systems, wherein "layback" arrangements could be achieved only by providing rearwardly inclined front support columns on the support frames, since each of the prior art shelf frame side rails was provided with only one location adjacent to each of the front and rear ends thereof for attachment to the support columns.

While the shelf frames 30 will serve as cross members of the storage rack bay 15 for holding the support frames upright, there is preferably also provided an angle brace 68 interconnecting the rearmost support columns 21 at the upper ends thereof, and a sway brace 69 interconnecting the frontmost support columns 21 at the upper ends thereof, further to rigidify the storage rack structure, the angle brace 68 and sway brace 69 being fixedly secured to the support frames by means of suitable fasteners extending through the circular holes 24 in the support columns 21. While the shelf frames 30 illustrated in the drawings are all of the substantially flat type, it will be understood that the shelf frames could have the front ends thereof downwardly inclined at various angles, as illustrated in U.S. Pat. No. 3,900,112, to facilitate removal of tall items from the cartons 16, all as is well-known in the art.

In addition to the mounting clips 60, auxiliary shelf clamps (not shown) may be used, particularly in the case of very deep storage rack bays 15, for connecting the shelf frame side rails 31 to intermediate support columns of the support frames 20.

One of the most important advantages of the front-to-back adjustability of the shelf frames 30 of the present invention is realized in mezzanine-type constructions, such as the one illustrated in FIG. 1. In such arrangements, two rows of storage rack bays are stacked one atop the other. While it is possible to stack storage rack bays 15 of the type illustrated in FIG. 2, with rearwardly inclined front support columns, it is much more convenient to stack storage rack bays having all vertical support columns, such as the bays illustrated in FIG. 1 and designated by the numeral 75. Each vertical support column 76 of the upper 75 may be directly connected in vertical alignment with the corresponding support column 76 of the lower bay 75, with cross braces 77 utilized where necessary to stabilize the arrangement.

In practice, two stacks of the bays 75 are arranged facing each other on opposite sides of an aisle 78. A mezzanine platform 80 spans the aisle 78 at the top of the lower bays 75, stairways (not shown) being provided at predetermined points along the aisle to provide access to the mezzanine platform 80. Preferably, there is provided behind each of the stacks of storage rack bays 75 a pallet storage rack 82 (one shown), which is spaced from the rear end of the associated bay 75 by an aisle 83. A catwalk 84 spans the aisle 83 and interconnects the pallet storage rack 82 and the storage rack bay 75 at the top of the lower bay 75. It will be understood that the pallet storage rack 82 extends the entire length of the row of storage rack bays 75.

In use, pallets containing reserve stocks of cartons are stored on the pallet storage racks 82 and cartons 16 are removed therefrom and inserted at the rear ends of the shelf frames 30 of the storage rack bays 75 for restocking thereof by personnel walking along the aisle 83 and the catwalk 84. Preferably, conveyors may be provided along the aisle 78 and the catwalk 80 for order-picking purposes. Personnel can then walk along the aisle 78 and the catwalk 80 and remove cartons or individual items from the shelf frames 30 and deposit them in containers for transmission along the conveyors in a well-known manner.

It will be appreciated that by reason of the adjustability of the shelf frames 30 of the present invention, a front-to-back staggered or "layback" arrangement of the shelf frames 30 may be provided on each of the upper and lower storage rack bays 75, despite the fact that all vertical support columns 76 are utilized.

In a constructional model of the present invention, the support frames 20 and sway braces 68 and 69 are preferably formed of steel, as are the shelf frame side rails 31, front rail 40, rear rail 45 and cross channels 47. The wheel tracks 50 and guide rails 55 may be formed of galvanized steel and the roller wheels 53 are preferably formed of high-density polyethylene. The mounting clips 60 are formed of plated steel and the attachment clips 54 are formed of a suitable plastic.

From the foregoing, it can be seen that there has been provided an improved gravity-feed storage and delivery system which includes improved mounting clips for interconnecting shelf frames and support frames, as well as a novel shelf frame side rail construction which affords front-to-back adjustability of the shelf frames with respect to the support frames and ready marking of the predetermined adjustment position.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A mounting clip for use in a gravity-feed merchandise storage and delivery rack for connecting a shelf frame side rail to an upstanding support column having a vertical wall with a plurality of longitudinally spaced-apart apertures therein, said mounting clip comprising an elongated channel-shaped body including a main wall and two side walls respectively projecting from the opposite side edges of said main wall and extending substantially the entire length thereof, prongs projecting from said side walls away from said main wall and receivable in selected ones of the apertures in an associated support column to secure said body in a mounted configuration on the support column, bearing surfaces on said side walls engageable with the vertical wall of the associated support column for limiting the depth of insertion of said prongs and cooperating therewith rigidly to hold said body in position on the support column, each of said side walls having a retaining surface thereon extending from one end thereof toward the corresponding bearing surface and inclined outwardly from said bearing surface toward said main wall, and each of said side walls having a support surface thereon extending between said bearing surface and said retaining surface thereof, said retaining surfaces cooperating with the vertical wall of the associated support column when said body is disposed in the mounted configuration thereon for receiving therebetween in wedging engagement therewith the lower end of the associated shelf frame side rail for providing a tight fit of the shelf frame side rail between the support column and said clip.

2. The mounting clip of claim 1, wherein each of said side walls has two retaining surfaces thereon respectively extending from the opposite ends thereof toward the corresponding bearing surface, and two support surfaces respectively extending between said bearing surface and said retaining surfaces.

3. In a gravity-feed merchandise storage and delivery rack, the combination comprising an upstanding support column having a vertical wall with a plurality of longitudinally spaced-apart apertures therein; a shelf frame having an elongated side rail adapted for connection to said support column for support thereby; and a mounting clip for interconnecting said shelf frame side rail and said support column, said mounting clip comprising an elongated channel-shaped body including a main wall and two side walls respectively projecting from the opposite side edges of said main wall and extending substantially the entire length thereof, prongs projecting from said side walls away from said main wall and receivable in selected ones of said apertures in said support column to secure said body in a mounted configuration on said support column, bearing surfaces on said side walls engageable with said vertical wall of said support column for limiting the depth of insertion of said prongs and cooperating therewith rigidly to hold said body in said mounted configuration on said support column, each of said side walls having a retaining surface thereon extending from one end thereof toward the corresponding bearing surface and inclined outwardly from said bearing surface toward said main wall, and each of said side walls having a support surface thereon extending between said bearing surface and said retaining surface, said retaining surfaces cooperating with said vertical wall of said support column when said body is disposed in the mounted configuration thereon for receiving therebetween in wedging engagement therewith said shelf frame side rail for providing a tight fit of said side rail between said support column and said clip.

4. The combination of claim 3, wherein said side rail has a bottom flange extending laterally therefrom, said bottom flange having an elongated gap therein in a region adjacent to the associated support column, said gap having a length several times the width of the associated support column to facilitate connection of said shelf frame side rail to said mounting clip.

5. The combination of claim 3, wherein each of said side walls of said mounting clip has two retaining surfaces thereon respectively extending from the opposite ends thereof toward the corresponding bearing surface, and two support surfaces respectively extending between said bearing surface and said retaining surfaces.

6. The combination of claim 3, wherein said side rail includes a stop tab thereon disposed for engagement with said mounting clip to limit front-to-back adjustment of said shelf frame with respect to said support column.

7. A shelf frame side rail for use in a gravity-feed merchandise storage and delivery rack including a plurality of upstanding support columns and a plurality of vertically-spaced shelf frames mounted between said support columns, said side rail comprising an elongated member adapted to extend along one side of an associated shelf frame, a bottom flange extending laterally from said elongated member, said bottom flange having elongated gaps therein in regions respectively adjacent to the associated support columns, each of said gaps having a length several times the width of the associated support column, said elongated member having a plurality of equidistantly longitudinally spaced-apart apertures therein adjacent to the rearmost gap in said bottom flange, and a stop member receivable in a selected one of said apertures and fixedly secured to said side rail and projecting from said elongated member for engagement with a rear one of the associated support columns when the associated shelf frame is mounted thereon accurately to position the shelf frame front-to-back with respect to the rack, thereby to facilitate front-to-back staggering of the shelf frames on the support columns.

8. The shelf frame side rail forth in claim 7, wherein said apertures are circular in shape.

9. The shelf frame side rail set forth in claim 7, wherein the centers of adjacent ones of said apertures are spaced apart substantially one-half inch.

10. In a gravity-feed merchandise storage and delivery rack, the combination comprising a plurality of upstanding support columns, and a plurality of vertically-spaced shelf frames mounted between said support columns, each of said shelf frames including a pair of elongated side rails, each of said side rails having a bottom flange extending laterally therefrom, said bottom flange having elongated gaps therein in regions respectively adjacent to the associated support columns, each of said gaps having a length several times the width of the associated support columns, front and back members interconnecting said side rails, merchandise support tracks carried between said front and back members, each of said side rails having a plurality of equidistantly longitudinally spaced-apart apertures therein adjacent to the rearmost gap in said bottom flange, and a stop member receivable in a selected one of said apertures and fixedly secured to said side rail and projecting from said side rail for engagement with a rear one of said support columns accurately to position said shelf frame front-to-back with respect to the rack, thereby to facilitate front-to-back staggering of said shelf frames on said support columns.

11. The combination of claim 10, wherein the frontmost ones of said support columns are substantially vertical.

12. The combination of claim 10, wherein each of said support columns is substantially vertical, each of said shelf frames being positioned a predetermined distance rearwardly of the adjacent shelf frame therebeneath.

13. In a gravity-feed merchandise storage and delivery rack, the combination comprising a plurality of upstanding support columns, each of said support columns having a vertical wall with a plurality of longitudinally spaced-apart apertures therein; a plurality of vertically-spaced shelf frames mounted between said support columns, each of said shelf frames including a pair of elongated side rails, each of said side rails having a bottom flange extending laterally therefrom, said bottom flange having elongated gaps therein in regions respectively adjacent to the associated support columns, each of said gaps having a length several times the width of the associated support column, front and back members interconnecting said side rails, merchandise support tracks carried between said front and back members, each of said side rails having a plurality of equidistantly longitudinally spaced-apart apertures therein adjacent to the rearmost gap in said bottom flange, and a stop member receivable in a selected one of said apertures and fixedly secured to said side rail and projecting from said side rail for engagement with a rear one of said support columns accurately to position said shelf frame front-to-back with respect to the rack; and a plurality of mounting clips for interconnecting said shelf frame side rails and said support columns, each of said mounting clips comprising an elongated channel-shaped body including a main wall and two side walls respectively projecting from the opposite side edges of said main wall and extending substantially the entire length thereof, prongs projecting from said side walls away from said main wall and receivable in selected ones of said apertures in an associated one of said support columns to secure said body in a mounted configuration on said support column, bearing surfaces on said side walls engageable with said vertical wall of the associated one of said support columns for limiting the depth of insertion of said prongs and cooperating therewith rigidly to hold said body in said mounting configuration on said column, each of said side walls having a retaining surface thereon extending from one end thereof toward the corresponding bearing surface and inclined outwardly from said bearing surface toward said main wall, and each of said side walls having a support surface thereon extending between said bearing surface and said retaining surface thereof, said retaining surfaces cooperating with said vertical wall of the associated support column when said body is disposed in the mounted configuration thereof to form a notch for receiving therein an associated one of said shelf frame side rails for engagement with said support surfaces and support thereon.

14. The combination of claim 13, wherein each of said side walls of said mounting clip has two retaining surfaces thereon respectively extending from the opposite ends thereof toward the corresponding bearing surface, and two support surfaces respectively extending between said bearing surface and said retaining surfaces.

15. A mezzanine construction for a gravity-feed merchandise storage and delivery system comprising a lower storage rack including a plurality of upstanding lower support frames having vertical members at the forwardmost portions thereof and a plurality of vertically-spaced shelf frames mounted between said support frames, an upper storage rack including a plurality of upstanding upper support frames having vertical members at the forwardmost portions thereof and a plurality of vertically-spaced shelf frames mounted between said upper support frames, said vertical members of said upper support frames being respectively disposed substantially in vertical alignment with said vertical members of said lower support frames and secured thereto, a horizontal platform disposed between said upper and lower storage racks and projecting forwardly and rearwardly therefrom for providing access to said upper storage rack, each of said shelf frames including an elongated side rail, a bottom flange extending laterally from said side rail, said bottom flange having elongated gaps therein in regions respectively adjacent to said vertical members of said support frames, each of said gaps having a length several times the width of the associated support frame vertical members, said side rail having a plurality of equidistantly longitudinally spaced-apart apertures therein adjacent to the rearmost gaps in said bottom flange, and a stop member receivable in a selected one of said apertures and projecting from said side rail for engagement with the rear end of an associated support frame accurately to position said shelf frame front-to-back with respect to the associated rack, thereby to facilitate front-to-back staggering of said shelf frames on said support frames in each of said upper and lower storage racks without the use of sloping support frames.

16. The mezzanine construction of claim 15, wherein each of said shelf frames is disposed a predetermined distance rearwardly of the adjacent shelf frame therebeneath in the same storage rack.

* * * * *